US008900661B2

(12) United States Patent
Schmidt et al.

(10) Patent No.: US 8,900,661 B2
(45) Date of Patent: *Dec. 2, 2014

(54) METHOD OF FILLING POROSITY OF CERAMIC COMPONENT

(75) Inventors: Wayde R. Schmidt, Pomfret Center, CT (US); David C. Jarmon, Kensington, CT (US); William K. Tredway, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 292 days.

This patent is subject to a terminal disclaimer.

(21) Appl. No.: 13/251,644

(22) Filed: Oct. 3, 2011

(65) Prior Publication Data
US 2013/0085057 A1 Apr. 4, 2013

(51) Int. Cl.
| | | |
|---|---|---|
| *C04B 35/00* | (2006.01) | |
| *C04B 35/52* | (2006.01) | |
| *C04B 35/10* | (2006.01) | |
| *C04B 35/58* | (2006.01) | |
| *C04B 35/584* | (2006.01) | |
| *C04B 35/565* | (2006.01) | |
| *B05D 1/36* | (2006.01) | |
| *B05D 7/22* | (2006.01) | |
| *C04B 41/00* | (2006.01) | |
| *C04B 35/82* | (2006.01) | |
| *C04B 35/628* | (2006.01) | |
| *C04B 35/14* | (2006.01) | |
| *C04B 41/85* | (2006.01) | |
| *C04B 41/50* | (2006.01) | |

(52) U.S. Cl.
CPC ............ *C04B 35/82* (2013.01); *C04B 2235/614* (2013.01); *C04B 2235/427* (2013.01); *C04B 2235/5244* (2013.01); *C04B 2235/3826* (2013.01); *C04B 41/009* (2013.01); *C04B 35/62871* (2013.01); *C04B 35/62863* (2013.01); *C04B 2235/36* (2013.01); *C04B 35/62873* (2013.01); *C04B 35/14* (2013.01); *C04B 35/6286* (2013.01); *C04B 2235/77* (2013.01); *C04B 2235/5256* (2013.01); *C04B 35/565* (2013.01); *C04B 35/62849* (2013.01); *C04B 2235/3821* (2013.01); *C04B 35/62868* (2013.01); *C04B 35/584* (2013.01); *C04B 41/85* (2013.01); *C04B 2235/5248* (2013.01); *C04B 2235/386* (2013.01); *C04B 2235/483* (2013.01); *C04B 41/5022* (2013.01); *C04B 2235/3873* (2013.01); *C04B 2235/3865* (2013.01)
USPC ...................................................... 427/230

(58) Field of Classification Search
CPC ........ C04B 35/00; C04B 35/01; C04B 35/14; C04B 35/565; C04B 38/0022; C04B 38/0051; C04B 38/0058; C04B 38/0061; C04B 41/45; C04B 41/4523; C04B 41/4578; C04B 41/4584; C04B 41/4586; C04B 2235/36; C04B 2235/77
USPC .................................................. 427/230–239
See application file for complete search history.

(56) References Cited

U.S. PATENT DOCUMENTS

| | | | | |
|---|---|---|---|---|
| 5,439,627 | A | * | 8/1995 | De Jager ........................ 264/129 |
| 5,569,422 | A | * | 10/1996 | Astier et al. ................ 156/89.11 |
| 6,451,416 | B1 | * | 9/2002 | Holowczak et al. ........ 428/293.4 |
| 6,696,144 | B2 | * | 2/2004 | Holowczak et al. ........ 428/293.4 |
| 7,749,568 | B2 | | 7/2010 | Schmidt |
| 8,105,967 | B1 | * | 1/2012 | Martin ......................... 501/97.4 |
| 8,545,938 | B2 | * | 10/2013 | Schmidt et al. ............. 427/248.1 |
| 2001/0036516 | A1 | * | 11/2001 | Schmidt ........................ 427/559 |
| 2008/0020193 | A1 | | 1/2008 | Jang et al. |
| 2008/0213498 | A1 | | 9/2008 | Drzal et al. |
| 2009/0069169 | A1 | * | 3/2009 | Bauer ........................... 501/95.2 |
| 2013/0224471 | A1 | * | 8/2013 | Sheedy et al. .............. 428/312.6 |

FOREIGN PATENT DOCUMENTS

| | | |
|---|---|---|
| EP | 0366234 | 5/1990 |
| EP | 0866041 | 9/1998 |
| EP | 1970359 | 9/2008 |

OTHER PUBLICATIONS

Brennan, J., Allen, W., McCluskey, P., and Jarmon, D. (1993). Processing and processing of coated HPZ fiber reinforced glass-ceramic matrix composites. United Technologies Corporation, Final Report for Air Force Office of Scientific Research. Mar. 31, 1993.
European Search Report for European Patent Application No. 12186879.8-1354 completed on Jul. 18, 2013.

* cited by examiner

*Primary Examiner* — William Phillip Fletcher, III
(74) *Attorney, Agent, or Firm* — Carlson, Gaskey & Olds, P.C.

(57) ABSTRACT

A method of fabricating a ceramic component includes initially partially filling pores of a porous structure using one of a first processing technique or a second, different processing technique to form a preform body with residual porosity. The first processing technique produces a first ceramic material in the pores of the porous structure and a second processing technique produces a second ceramic material in the pores of the porous structure. When the first processing technique is used to initially partially fill the pores of the porous structure, the second processing technique is used thereafter to at least partially fill the residual porosity with the second ceramic material. When the second processing technique is used to initially partially fill the pores, the first processing technique is used thereafter to at least partially fill the residual porosity.

16 Claims, 1 Drawing Sheet

METHOD OF FILLING POROSITY OF CERAMIC COMPONENT

BACKGROUND

This disclosure relates to ceramic materials. Ceramic materials are known and used for components such as coatings, ceramic bodies and ceramic matrices. For example, ceramic materials are fabricated using techniques such as polymer impregnation and pyrolysis, melt infiltration, slurry infiltration, slip casting, tape casting, injection molding, dry pressing, isostatic pressing, hot isostatic pressing and others. The selected processing technique controls the chemistry and microstructure of the ceramic material and thus can also limit the chemistry and microstructure.

SUMMARY

Disclosed is a method of fabricating a ceramic component. An example includes initially partially filling pores of a porous structure using one of a first processing technique or a second, different processing technique to form a preform body with residual porosity. The first processing technique produces a first ceramic material in the pores of the porous structure and the second processing technique produces a second ceramic material in the pores of the porous structure. The second ceramic material is different from the first ceramic material in at least one of a composition, microstructure and physical property. When the first processing technique is used to initially partially fill the pores of the porous structure, the second processing technique is thereafter used to at least partially fill the residual porosity. When the second processing technique is used to initially partially fill the pores, the first processing technique is thereafter used to at least partially fill the residual porosity.

In one aspect, the first processing technique includes infiltration with a preceramic polymer material and a thermal treatment to convert the preceramic polymer material to a ceramic material and the second processing technique includes infiltration with a heated, liquid glass or glass/ceramic material and solidification to a solid glass or glass/ceramic material.

Also disclosed is a ceramic component that includes a porous structure having fibers and a coating on the fibers. A ceramic material is located within pores of the porous structure. A glass or glass/ceramic material is also located within pores of the porous structure. One of the ceramic material or the glass or glass/ceramic material is within internal residual porosity of the other of the ceramic material or the glass or glass/ceramic material.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
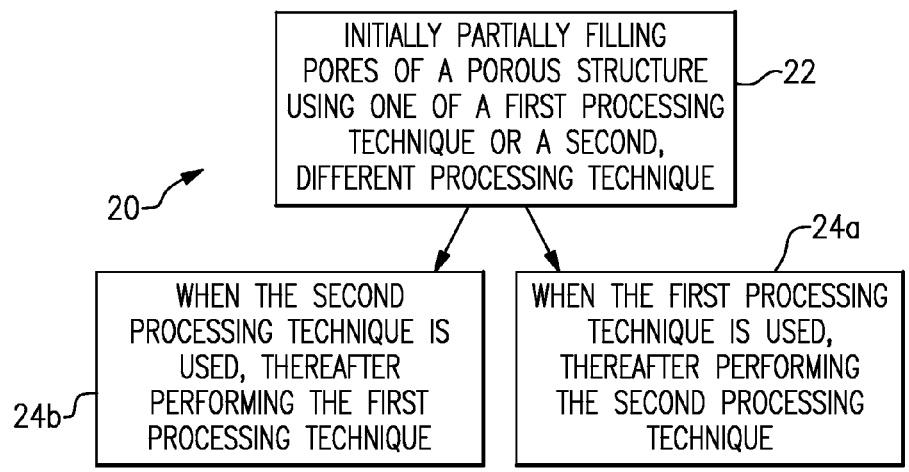
FIG. 1 illustrates an example method of fabricating a ceramic component.

FIG. 1 illustrates an example method 20 of fabricating a ceramic component. As will be appreciated, the method 20 permits fabrication of ceramic components having unique compositions and/or microstructures that are not heretofore available. Furthermore, the method 20 can be used to produce compositions and/or microstructures for the enhancement of densification, thermal conductivity or other target property in components such as cooled turbine engine components.

As illustrated in FIG. 1, the method 20 generally includes an initial infiltration step 22 and further infiltration steps 24a and 24b. As shown, initial infiltration step 22 includes initially partially filling pores of a porous structure using one of a first processing technique or a second, different processing technique. If selected for initially partially filling the pores, the first processing technique produces a first ceramic material in the pores. Alternatively, the second processing technique produces a second ceramic material that initially partially fills the pores. The second ceramic material is different from the first ceramic material in at least one of composition, microstructure and physical property. The infiltration step 22 results in the intermediate formation of a preform body with residual porosity.

The term "processing technique" refers to the kind of the technique, rather than to variations between specific, but similar processes. Processing techniques differ in the way that ceramic precursors are delivered into a green state and the formation mechanisms of the final ceramic material from the precursor(s). Thus, techniques that utilize delivery/formation mechanisms via polymer infiltration/pyrolysis, solvent infiltration/sintering, melt infiltration/solidification, vapor deposition, dry powder/sintering, and pressure injection/sintering are different processing techniques.

In addition, although some characteristics may differ between two specific processes, such characteristics do not differentiate the two processes when the methods of delivery of the precursors are the same or the formation mechanisms are the same. For instance, one melt infiltration technique is not different from another melt infiltration technique merely because the temperatures of the infiltrations differ, nor are two polymer infiltration/pyrolysis techniques different merely because different polymer precursors are used. However, polymer infiltration/pyrolysis is a different processing technique than melt infiltration/solidification even though each includes infiltration because the infiltrations utilize different precursors that form the respective final ceramic materials via different formation mechanisms, pyrolysis and solidification, respectively. Given this description, one of ordinary skill in the art will be able to distinguish different processing techniques.

In embodiments, the first and second processing techniques are selected from the techniques of polymer infiltration/pyrolysis, solvent infiltration/sintering, melt infiltration/solidification, vapor deposition, dry powder/sintering, and pressure injection/sintering. In further examples, however, the first and second processing techniques are not limited to these disclosed techniques and other techniques are alternatively used, assuming compatibility between the selected techniques with regard to delivery and formations mechanisms.

The infiltration steps 24a and 24b depend upon which processing technique is used to initially partially fill the pores of the porous structure. In step 24a, when the first processing technique is used to initially partially fill the pores of the porous structure, the second processing technique is performed thereafter to at least partially fill the residual porosity with the second ceramic material. Alternatively, in step 24b, when the second processing technique is instead used to initially partially fill the pores of the porous structure, the first processing technique is performed thereafter to at least partially fill the residual porosity with the first ceramic material. Thus, in either alternative, the latter-used processing technique serves to at least partially backfill the residual porosity that remains within the preform body from the earlier-used processing technique. In this regard, the two processing techniques are fully compatible such that either can be the earlier-used or latter-used processing technique, to partially fill the residual porosity and thereafter at least partially fill the residual internal porosity such that a total void volume of the ceramic component is less than five volume percent.

The filling of the residual porosity (at least partially) by the latter-used processing technique increases the densification of the final component and can optionally be used to enhance other properties of the component, such as thermal conductivity or mechanical properties. In one example, the residual void volume after the latter-used processing technique is less than five volume percent. In a further example, the residual void volume is less than one volume percent.

In one embodiment, the first processing technique includes infiltration with a preceramic polymer material and a thermal treatment to convert the preceramic polymer material to a ceramic material. For example, the preceramic polymer material is a polycarbosilane that decomposes to silicon carbide. In another example, the preceramic polymer is a polycarbosiloxane that decomposes into silicon oxycarbide. In still another example, the polymer is a polysilazane material that decomposes to silicon carbide, silicon carbonitride, silicon nitride or combinations thereof. Additional preceramic polymers and combinations of preceramic polymers are also contemplated. The thermal treatment is conducted in a controlled environment with regard to at least one of temperature, time and process gas, or in a variety of different controlled environments, to control the composition of the resulting ceramic material. Further, the preceramic polymer material can include fillers, such as silicon carbide, aluminum nitride, boron carbide, refractory materials, boron nitride, silicon nitride, diamond and combinations thereof, to control the properties and/or composition of the resulting ceramic material.

The second processing technique includes infiltration of the residual porosity with a heated, liquid glass or glass/ceramic material (e.g., glass transfer molding) and solidification of the liquid glass or glass/ceramic material to a solid glass or glass/ceramic material. As used herein, the term "ceramic" refers to inorganic, non-metallic materials that may be crystalline, partially crystalline or substantially or fully amorphous. Further, the term "glass" as used herein, refers to an amorphous or partially amorphous ceramic material. Also further, the term "glass/ceramic" as used herein is a glass composition that, upon proper controlled exposure to temperature, time, pressure, and environmental conditions will precipitate out one or more beneficial crystalline ceramic phase(s) for property modification. Glass/ceramic materials are known to share many properties with both glasses and ceramics.

In a further embodiment, the porous structure is a porous fibrous structure. For example, the porous fibrous structure is a fabric, weave, braid, tape, two-dimensional, or three-dimensional woven or non-woven structure that is coated or uncoated with a protective coating. In one example, the porous fibrous structure includes ceramic fibers and/or carbon fibers. In some examples, the ceramic fibers include oxide or non-oxide ceramic fibers. In a further example, the fibers are silicon carbide fibers. In other examples, the fibers are silicon oxycarbide, doped-silicon carbide or silicon oxycarbide and/or glass or glass/ceramic fibers. It is to be understood that the porous structure may alternatively be another kind of porous structure that may or may not include fibers.

In a further embodiment, the porous fibrous structure includes a protective coating on the fibers. The protective coating includes an oxide layer, a non-oxide layer or both and can be a monolayer coating or a multilayer coating. For instance, the protective coating includes one or more layers of carbon, boron nitride, boron carbide, silicon nitride, silicon carbide and aluminosilicate. The function of the protective coating may be selected to prevent degradation of the underlying fibrous structure or to control the interactions between the fibrous structure and the void filling materials described herein.

In a further embodiment, the glass or glass/ceramic material is silicate-based. For example, the silicate-based glass or glass/ceramic includes boron, barium, magnesium, lithium, aluminum or combinations thereof. In a further example, the silicate-based glass or glass/ceramic additionally includes a nucleating agent that serves to precipitate crystalline phases from the amorphous phase with the application of thermal treatment. In one non-limiting example, the nucleating agent includes zirconium or a compound containing zirconium.

In a further embodiment, the selected glass or glass/ceramic material additionally includes a solid filler to modify the properties of the ceramic component. In one example, the solid filler is a solid ceramic filler, such as silicon carbide. In other examples, the solid filler is a silicon-containing filler, such as oxides, nitrides, borides, carbides and combinations thereof that include silicon.

The composition with regard to the volume percentages of the porous structure, any protective coating on the porous structure and the ceramic material from the polymer infiltration/pyrolysis processing technique are controlled such that the residual porosity of preform body is within a predetermined range. As an example, the predetermined range is selected such that, once backfilled with the glass or glass/ceramic material from the glass transfer/solidification processing technique, there is a targeted volume percentage of the glass or glass/ceramic material. Thus, the method 20 can be tailored to control the volume percentages of the ceramic and glass or glass/ceramic phases. In one example, the residual porosity of the preform body is no greater than approximately 43 volume percent.

In another example, the predetermined range is selected such that the residual porosity in the preform body is surface connected and interconnected. That is, the porosity is above a percolation threshold. In one example, the residual porosity is approximately 20-43 volume percent of the preform body. The surface connection and interconnection permits the liquid glass or glass/ceramic material in the latter-used processing technique to infiltrate through the preform body to enhance the density of the final ceramic component. In one example, the final ceramic component has a residual void volume of less than five volume percent, and in further examples less than one volume percent.

In another embodiment, the first processing technique is used to initially partially fill the pores of the porous structure. Prior to performing the second processing technique, the first processing technique is repeated for a selected number of cycles to control the residual porosity to be within a predetermined range. In one example, the processing technique of infiltration with a preceramic polymer and thermal treatment to convert the polymer to ceramic material is repeated between two and nine times to sequentially reduce the residual porosity to the predetermined range. When the residual porosity is within the predetermined desired range, a second processing technique of infiltration with a heated, liquid glass or glass/ceramic material and solidification is then performed to at least partially fill the remaining residual porosity.

Similarly, if the second processing technique is used to initially partially fill the pores of the porous structure, the second processing technique can be repeated for a selected number of cycles before performing the first processing technique. As an example, the processing technique of infiltration with the heated, liquid glass or glass/ceramic material and solidification is repeated before performing a second processing technique of infiltration with the preceramic polymer and the thermal treatment to convert the polymer to ceramic material.

In another alternative, the first processing technique is used to initially partially fill the pores of the porous structure and the second processing technique is thereafter performed to partially fill the residual porosity. Either the first or second processing technique is then repeated for a selected number of cycles to at least partially fill any remaining porosity after the second processing technique. A user can subsequently perform additional cycles of the first and/or second processing techniques to further densify or modify the properties of the ceramic component.

In a further example of the method 20, a preceramic polymer material is impregnated into a porous structure that includes a fibrous sheet that is coated or uncoated with a protective coating. For instance, the fibrous sheet is a fabric, weave, tape or braid. Alternatively, the porous structure can be another type of two-dimensional fiber structure or three-dimensional woven or non-woven structure. The fibrous sheet is then divided into plies and the plies are stacked in a desirable orientation relative to one another. The stack is then compressed, under heat, to consolidate the sheets and polymerize, rigidize or cure the preceramic polymer. Alternatively, the stacked sheets are vacuum-bagged in an autoclave process to consolidate and cure the sheets into a more complex geometry.

The consolidated sheets are then pyrolyzed at a suitable temperature and time in a controlled environment to convert the preceramic polymer to ceramic material and thereby form a preform body having a residual porosity. The preform body is then subjected to a ceramic glass-transfer molding process in which the body is located in a suitable molding tool. Molten glass or glass/ceramic of a selected composition is injected into the tool cavity to infiltrate the residual porosity of the preform body. The component is then cooled to solidify the glass or glass/ceramic into a solid glass or glass/ceramic material. Optionally, an additional heat treatment is conducted to crystallize the solid glass or glass/ceramic and/or grow crystals of desired ceramic phase(s) in a controlled manner.

Figure 2:
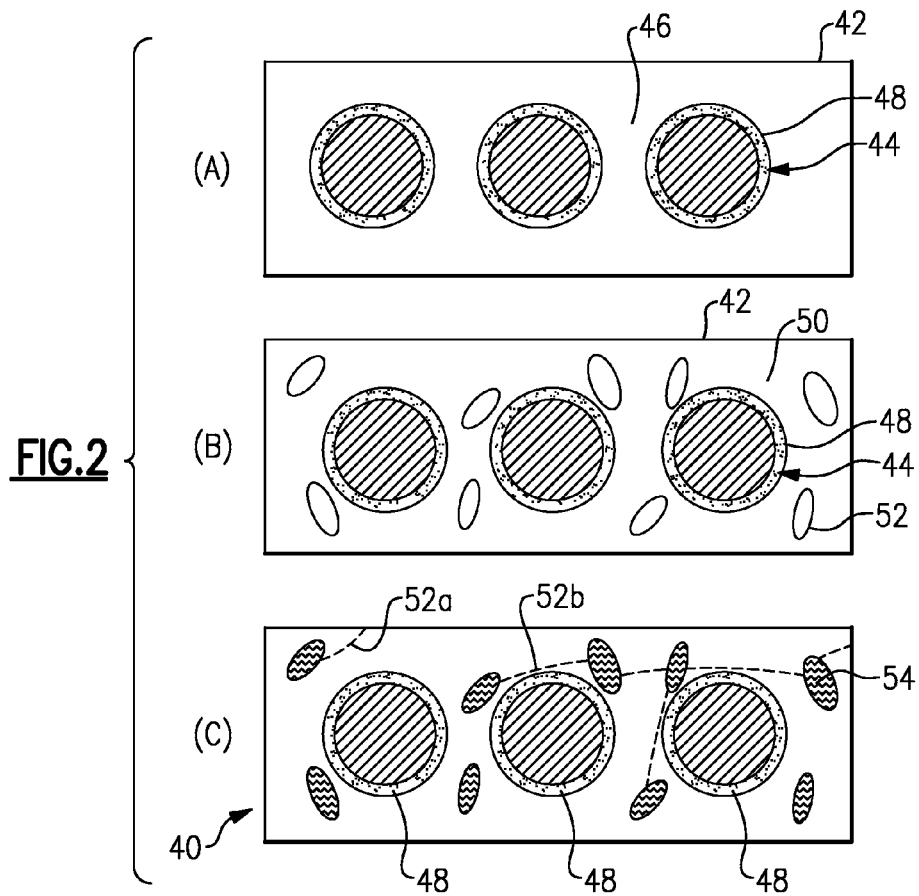
FIG. 2 illustrates various stages through fabrication of a ceramic component.

FIG. 2 illustrates three different stages (A), (B) and (C) in a fabrication of a final ceramic component 40 according to the method 20. It is to be understood that the method 20 is not limited to fabrication of the exemplary ceramic component 40. As shown in initial stage (A), a porous structure 42 includes a plurality of fibers 44 that define open pores 46 there between. Optionally, as shown, each of the fibers 44 includes a protective coating 48 of composition described herein disposed on the outer surfaces of the fibers 44.

As shown in stage (B), the pores 46 are initially partially filled by the first or second processing technique with a ceramic material 50 of composition described herein, which thereby forms a preform body with residual porosity 52. At least a portion of the residual porosity 52 is surface-connected, as shown schematically by dashed lines 52a. Additionally, in one example, at least a portion of the residual porosity 52 is interconnected, as represented schematically at dashed line 52b. The residual porosity includes residual internal porosity defined by the ceramic material 50. The residual internal porosity includes voids, micro-cracks or other open regions that are bounded by the ceramic material 50 and which evolve from the processing technique that forms the ceramic material 50.

As shown at stage (C), the latter-used processing technique at least partially fills the residual porosity 52 with another ceramic material 54 of composition described herein that is different from the ceramic material 50 in at least one of composition, microstructure or physical property. Thus, the ceramic material 54 at least partially fills the residual porosity 52 within the ceramic material 50.

In a further example, the ceramic material 50 has a coefficient of thermal conductivity that is greater than the coefficient of thermal conductivity of the other ceramic material 54. Thus, the ceramic material 50 is selected for enhancement of thermal conductivity of the ceramic component 40, while the other ceramic material 54 can be selected to enhance other properties of the ceramic component 40, such as thermal resistance, dimensional stability and corrosion resistance.

The ceramic materials 50 and 54 are alternatively transposed in the microstructure such that the regions shown as being occupied by the ceramic material 54 are occupied by the ceramic material 50, and vice versa. In this example, the ceramic material 54 is initially infiltrated into the pores 46 of the porous structure 42 to partially fill the pores 46, leaving a residual porosity that is then later at least partially filled with the ceramic material 50.

In the illustrated example, the ceramic component 40 includes a final composition, by volume percentage, of:
  20-70 of the porous structure 42,
  1-12 of the coating 48 on the porous structure 42,
  1-75 of the ceramic material 50 or 54, and
  a balance of the other ceramic material 50 or 54 and residual void volume, wherein the residual void volume is less than 5 volume percent.

In a further example, the final composition includes:
  30-50 of the porous structure 42,
  2-5 of the coating 48,
  25-65 of the ceramic material 50 or 54, and
  a balance of the other ceramic material 50 or 54 and the residual void volume.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of fabricating a ceramic component, the method comprising:
  initially partially filling pores of a porous structure using one of a first processing technique or a second, different processing technique to form a preform body with residual porosity, the processing techniques differing with respect to the way that ceramic precursors are delivered into a green state and formation mechanisms of final ceramic materials from the ceramic precursors, the first processing technique producing a first ceramic material in the pores and the second processing technique producing a second ceramic material in the pores that is different from the first ceramic material in at least one of composition, microstructure and physical property;

when the first processing technique is used to initially partially fill the pores of the porous structure, thereafter performing the second processing technique to at least partially fill the residual porosity with the second ceramic material; and when the second processing technique is used to initially partially fill the pores of the porous structure, thereafter performing the first processing technique to at least partially fill the residual porosity with the first ceramic material.

2. The method as recited in claim 1, wherein the first ceramic material is crystalline and the second ceramic material is amorphous glass.

3. The method as recited in claim 1, wherein the porous structure includes coated fibers.

4. The method as recited in claim 1, wherein a total void volume after the first processing technique and the second processing technique is less than 1 volume percent.

5. The method as recited in claim 1, including initially partially filling the pores using the first processing technique and, prior to performing the second processing technique, repeating the first processing technique to control the residual porosity to be within a predetermined range of 20-43 volume percent of the preform body.

6. A method of fabricating a ceramic component, the method comprising:

initially partially filling pores of a porous structure using one of a first processing technique or a second processing technique to form a preform body with residual porosity, the processing techniques differing with respect to the way that ceramic precursors are delivered into a green state and formation mechanisms of final ceramic materials from the ceramic precursors, the first processing technique including infiltration with a preceramic polymer material and thermal treatment to convert the preceramic polymer material to a ceramic material and the second processing technique including infiltration with a heated, liquid glass or glass/ceramic material and solidification of the liquid glass or glass/ceramic material to a solid glass or glass/ceramic material;

when the first processing technique is used to initially partially fill the pores of the porous structure, thereafter performing the second processing technique to at least partially fill the residual porosity with the solid ceramic glass material; and when the second processing technique is used to initially partially fill the pores of the porous structure, thereafter performing the first processing technique to at least partially fill the residual porosity with the ceramic material.

7. The method as recited in claim 6, including initially partially filling the pores using the first processing technique.

8. The method as recited in claim 6, including initially partially filling the pores using the second processing technique.

9. The method as recited in claim 6, wherein the residual porosity is interconnected.

10. The method as recited in claim 6, wherein the residual porosity is no greater than approximately 43 volume percent of the preform body.

11. The method as recited in claim 6, wherein the residual porosity is 20-43 volume percent of the preform body.

12. The method as recited in claim 6, wherein a total void volume after the first processing technique and the second processing technique is less than 1 volume percent.

13. The method as recited in claim 6, wherein the ceramic material includes filler particles selected from a group consisting of silicon carbide, aluminum nitride, boron carbide, refractory materials, boron nitride, diamond and combinations thereof.

14. The method as recited in claim 6, including a final composition, by volume percentage, of:
   20-70 of the porous structure,
   1-12 of a coating on the porous structure,
   1-75 of the ceramic material, and
   a balance of the solid glass or glass/ceramic material and residual void volume, wherein the residual void volume is less than 5 volume percent.

15. The method as recited in claim 14, wherein the final composition includes:
   30-50 of the porous structure,
   2-5 of the coating,
   25-65 of the ceramic material, and
   a balance of the solid glass or glass/ceramic material and the residual void volume.

16. The method as recited in claim 6, including initially partially filling the pores using the first processing technique and, prior to performing the second processing technique, repeating the first processing technique between two and nine times to control the residual porosity to be within a predetermined range.

* * * * *